Nov. 25, 1924.                       H. E. YODER                        1,517,140
                                  ANTIBUTTING HALTER
                                  Filed Aug. 6, 1924

Inventor
Harvey E. Yoder

By Clarence A. O'Brien
                Attorney

Patented Nov. 25, 1924.

1,517,140

UNITED STATES PATENT OFFICE.

HARVEY E. YODER, OF OYSTER POINT, VIRGINIA.

ANTIBUTTING HALTER.

Application filed August 6, 1924. Serial No. 730,454.

*To all whom it may concern:*

Be it known that I, HARVEY E. YODER, a citizen of the United States, residing at Oyster Point, in the county of Warwick and State of Virginia, have invented certain new and useful Improvements in an Antibutting Halter, of which the following is a specification.

This invention relates to new and useful improvements in animal restraining devices and is more particularly adapted to a halter which when placed in position on the head of an animal will prevent the animal from butting other animals, pricking means being associated with the halter for causing slight pain to the animal when attempting to butt another animal.

A further object of the invention is to provide an anti-butting halter of the above mentioned character, which may be readily and easily placed in position on the head of the animal without interfering with the eating by the animal.

A still further object of the invention is to provide an anti-butting halter of the above mentioned character, which is simple in construction, inexpensive, strong and durable and furthermore adapted for the purposes for which it is designated.

Other objects and advantages of this invention will become apparent during the course of the following description.

Figure 1:
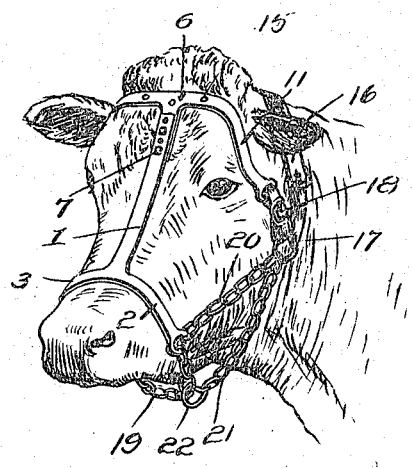
Figure 2:
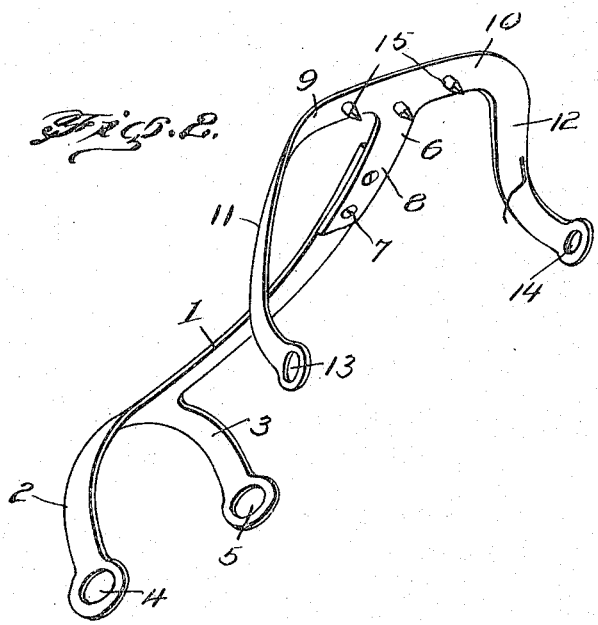

In the accompanying drawing forming a part of this specification and in which like numerals designate like parts throughout the same:

Figure 1 is a perspective view of my improved anti-butting halter showing the same in position on the head of the animal, and Figure 2 is a detail perspective view of the same with the attaching means removed therefrom.

In the drawing wherein for the purpose of illustration is shown the preferred embodiment of my invention, the numeral 1 designates an elongated bar which is slightly curved and terminates at its lower end in the laterally extending arms 2 and 3 respectively, the same being curved and disposed rearwardly so as to extend over the nose of the animal in the manner clearly illustrated in the drawing. The ends of the laterally extending curved arms 2 and 3 are enlarged and are provided with the openings 4 and 5 respectively as illustrated more clearly in Figure 2 of the drawing and the purpose thereof will hereinafter be more fully described.

Adjustably secured to the upper end of the elongated bar 1 is the substantially T-shaped member designated generally by the numeral 6. Any suitable fastening means such as is illustrated at 7 is provided for cooperation with the registering openings provided in the upper end of the bar 1 and the leg or shank portion 8 of the T-shaped member 6 whereby the latter is adjustably secured in position on the upper end of the bar. The arms 9 and 10 respectively of the T-shaped member 6 extend over the forehead of the animal and terminate in the downwardly extending rearwardly disposed portions 11 and 12 respectively which are of such shape as to conform to the respective sides of the head of the animal as is clearly illustrated in Figure 1.

The extensions 11 and 12 are also provided with enlarged ends and the same are further provided with the openings 13 and 14 respectively. Pricking members such as spurs or the like extend inwardly from the T-shaped member 6 in the manner as illustrated at 15 in the drawing and any number of these spurs may be provided as is desired.

The attaching means for the anti-butting halter comprises a head strap 16 which is fastened to the respective eyes 13 and 14 formed in the extensions 11 and 12 respectively through the medium of the ring 17 and the eye engaging strap 18. Connected to the eye portions 4 and 5 of the laterally extending arms 2 and 3 and extending under the chin or lower jaw of the animal is the chain or other fastening element 19. Secured at one of the eye portions formed in the enlarged end of the laterally extending arms at the lower end of the bar and at its opposite end to the ring 17 is a cheek strap or chain 20. Two of such chains are provided and one extends on one side of the face of the animal while the other extends on the other side. A chain such as is illustrated at 21 has its free ends secured to the ring 17 and at its intermediate portion is secured to the chin strap or chain 19 through the medium of the ring 22.

The head strap 16 is provided with the usual buckle connection for facilitating the applying or removal of the halter from the head of the animal in the manner well known in the art.

When the anti-butting halter is in position on the head of the animal, the same will normally be positioned so as not to interfere with the animal eating and the spurs will not prick the head of the animal. Should the animal wearing the halter attempt to butt another animal, the spurs 15 will be caused to prick the forehead of the animal and cause slight pain, sufficient to restrain the animal from further attempting to butt another animal.

The simplicity of my device enables the same to be readily and easily applied in position on the head of an animal and is further of such a construction as to render the operation thereof for carrying out the purposes for which the same is designated positive and very efficient. The anti-butting halter may be constructed of any suitable metallic material for rendering the same strong and durable.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

An antibutting halter of the class described comprising an elongated bar, curved arms extending laterally from the lower end thereof over the nose of an animal, the ends of said arms being provided with eyes, a substantially T-shaped member adjustably secured to the upper end of said bar, the arms of the T-shaped member extending over the forehead of the animal, spurs on the inner side of said arms, extensions formed on said arms, said extensions being disposed downwardly and rearwardly over the sides of the head of the animal, the ends of said extension being provided with eyes, a head strap secured to the eye portions of said extensions, a chin strap secured to the eye portions of the curved arms, cheek straps between the eye portions of the aforementioned curve arms, and the head straps, and a connection between the chin strap and the head strap.

In testimony whereof I affix my signature.

HARVEY E. YODER.